United States Patent [19]

Seyfang

[11] Patent Number: 5,161,741
[45] Date of Patent: Nov. 10, 1992

[54] AIRCRAFT NOZZLE CONTROL APPARATUS

[75] Inventor: George R. Seyfang, Preston, United Kingdom

[73] Assignee: British Aerospace Public Limited Company, London, England

[21] Appl. No.: 129,443

[22] Filed: Nov. 24, 1987

[30] Foreign Application Priority Data

Dec. 1, 1986 [GB] United Kingdom ............... 8628674

[51] Int. Cl.$^5$ ............................................. B64C 29/04
[52] U.S. Cl. ............................... 239/265.35; 244/12.5
[58] Field of Search ...................... 239/265.11, 265.19, 239/265.35; 244/12.4, 12.5, 56; 60/228, 230, 233

[56] References Cited

U.S. PATENT DOCUMENTS

| | | | |
|---|---|---|---|
| 4,000,854 | 1/1977 | Konarski | 239/265.35 |
| 4,280,660 | 7/1981 | Wooten | 239/265.35 |
| 4,343,446 | 8/1982 | Langley | 244/12.5 |
| 4,660,767 | 4/1987 | Scrace | 239/265.35 |

Primary Examiner—Michael J. Carone
Attorney, Agent, or Firm—Cushman, Darby & Cushman

[57] ABSTRACT

The invention concerns nozzle control apparatus for VSTOL aircraft power plant having at least one vectorable thrust nozzles 22. The apparatus comprises oscillating means for oscillating the nozzles about a generally vertical axis (at least) so as to enlarge the area 30 affected by the exhaust gases 25, 26 from the nozzles 22 during hovering and/or landing.

In the prior art, the hot jet 26 impinges on a relatively small area 30 of the surface 12 which area rapidly exhibits erosion effects; it has been found that the erosion is generally proportional to the local rate of heating, with a surface time constant of a few seconds. Accordingly, ground/deck erosion is alleviated by spreading out the jets 25, 26 and especially the latter to increase their 'footprint', i.e. if the area 32 of the surface 12 being heated is enlarged.

9 Claims, 2 Drawing Sheets

AIRCRAFT NOZZLE CONTROL APPARATUS

This invention concerns nozzle control apparatus for aircraft, and more particularly for jet-powered vertical or short take-off and landing aircraft (VSTOL) of which the best known example is the Harrier manufactured by the applicants.

When a VSTOL hovers close to the landing ground or a ship's deck, the hot exhaust gases may cause damage to the surfaces. In the case of a concrete surface, the concrete may be eroded whilst in the case of a ship's deck, its metallic surface may buckle. The extent of the damage is a function of the proximity of the nozzle outlet, the duration of the exposure and the pressure and temperature of the exhaust gases.

As regards proximity and duration, it is often desirable for VSTOL aircraft to hover over the same spot for extended periods, yet ground erosion can be observed after a period of about 10 seconds at a height of 10 m.

The trend in jet engine development is for ever higher gas pressures and temperatures, and so erosion problems are unlikely to be successfully overcome by the application of special surface-protective materials; solutions involving thicker concrete and decking are clearly very expensive. In any case, such special measures can only be undertaken at pre-planned landing pads, but it is desirable for VSTOL aircraft to operate and land on unprepared ground or deck.

In one aspect thereof, the present invention accordingly seeks to provide a solution to the problem of ground/deck erosion from the vectorable thrust nozzles of VSTOL aircraft, the solution being relatively simple and inexpensive, whilst not incurring any appreciable penalties in aircraft weight, thrust output during jet-borne flight (hovering) or in stability.

According therefore to one broad aspect of the invention, there is provided nozzle control apparatus for VSTOL aircraft power plant having at least one vectorable thrust nozzle, said apparatus comprising oscillating means for oscillating said nozzle(s) about at least one axis so as to enlarge the area affected by the exhaust gases therefrom during hovering and/or landing.

Preferably, the said oscillating means is effective to oscillate the or each nozzle about two axes.

The oscillating means may include generating means for generating a modulating signal and applying it to the powered means that in use effects the vectoring movement of the or each nozzle; the oscillation may be ±10° about a generally vertical axis and it may be in two places, combining rocking and rotating movements.

In this specification the term 'oscillating' shall mean reciprocating or moving to and fro rhythmically about a mean position, or dithering or perturbing in a random or semi-random manner but so that the time-averaged position is a selected or desired position, and the terms 'oscillate' and 'oscillating means' shall be construed accordingly.

The invention also includes a gas turbine engine for a VSTOL aircraft including at least one vectorable thrust nozzle and nozzle control apparatus as set forth above.

Preferably, however, there is a plurality of said nozzles, which in use oscillate in synchronism with each other. Alternatively, however, the nozzles may oscillate out of phase: thus, in an aircraft having a pair of nozzles on either side of the fuselage, the front and rear nozzles may be oscillated out of phase or the left and right nozzles may be oscillated out of phase. In such aircraft, the front nozzle is often termed the 'cool' nozzle, as it receives the exhaust from the compressor of the jet engine, while the rear nozzle is termed the 'hot' nozzle, as it receives the exhaust from the turbine; and since ground/deck erosion is far more severe from hot exhaust gases, in a preferred embodiment only the 'hot' nozzle(s) may be oscillated.

The invention also extends to VSTOL aircraft having a gas turbine engine power plant including nozzle control apparatus as set forth above.

In a further aspect of the present invention, there is provided a method of operating the vectorable nozzle(s) of a VSTOL aircraft during hovering and landing, comprising oscillating the substantially vertically extending nozzle(s) about a generally vertical axis so as to enlarge the area affected by the exhaust gases therefrom.

The invention will now be described, merely by way of example, with reference to the accompanying purely diagrammatic drawings, wherein.

Throughout the drawings like parts have been allotted like reference numbers.

Figure 1:
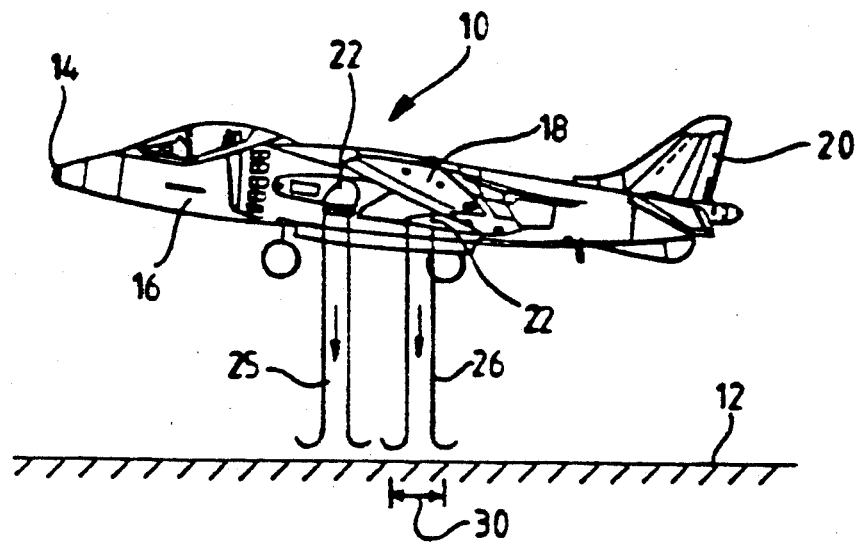
FIG. 1 is an elevational view of a VSTOL aircraft, such as a Harrier jump jet, in its hovering or jet-borne position.

Referring first to FIG. 1, there is shown a VSTOL aircraft 10 in its hovering position at an altitude of, typically 10 m above a solid surface 12 which may be a concrete runway or landing pad or a ship's deck.

The aircraft 10 has a nose 14, fuselage 16, wings 18 and a tail structure 20 all of which are known in themselves and need not therefore be described in detail. The aircraft 10 is powered by a single gas turbine engine (not shown), as in the Harrier aircraft, or it may be powered by two gas turbine engines (not shown), one on each side of the fuselage 16. Also as known, the single engine may have front and rear pairs of thrust nozzles 22 which are vectorable between a generally horizontal or axial orientation for wing-borne flight and a generally vertical orientation for jet-borne flight, as illustrated.

The front nozzle pair 22 of the single-engine embodiment is connected to receive relatively cool exhaust gas from the compressor of the engine and it is therefore referred to hereafter as the 'cold' nozzle; correspondingly, the jet 25 of exhaust gases therefrom is referred to as the 'cool' jet. On the other hand, the rear nozzle pair 22 is connected to receive relatively hot exhaust gas derived from air which has been compressed, mixed with fuel and ignited in a combustion chamber, and expanded through a turbine (and, optionally, reheated downstream of the turbine); hence the rear nozzle will be referred to as the 'hot' nozzle. Correspondingly, the jet 26 from the 'hot' nozzle will be referred to as the 'hot' jet.

It will be seen that the hot jet 26 impinges on a relatively small area 30 of the surface 12 which area rapidly exhibits erosion effects; it has been found that the erosion is generally proportional to the local rate of heating, with a surface time constant of a few seconds. Although the jet pressure ratio and the number of jets also influence the erosion rate, the primary erosion effect depends on the heat (joules per second per m² of surface area) and length of hovering time (seconds).

Accordingly, ground/deck erosion should be alleviated if the jets 25, 26 and especially the latter, are spread out to increase their 'footprint', i.e. if the area 30 of the surface 12 being heated is enlarged.

Figure 2:
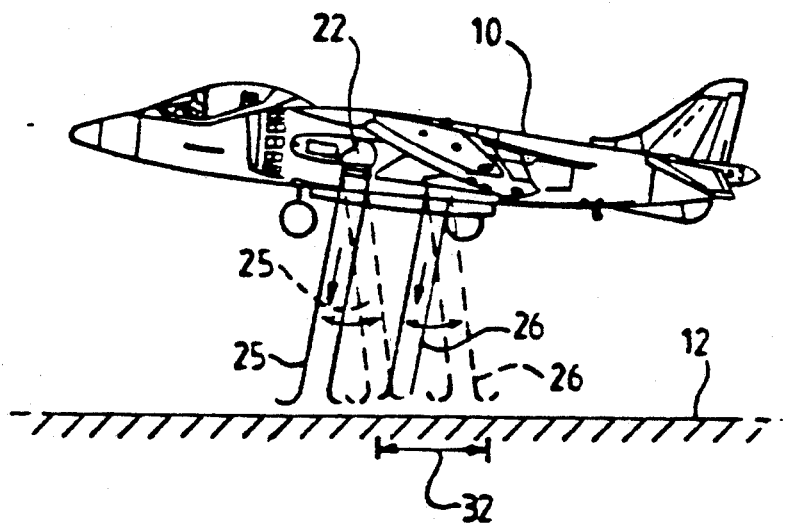
FIG. 2 is a corresponding elevational view of a VSTOL aircraft according to a first preferred embodiment of the present invention.

One practical embodiment for achieving such enlargement is shown in FIG. 2. The nozzles 22 are oscillated by a small angle, e.g. ±10°, and at a typical frequency of 2 Hz, about their normal vertical position during hovering or landing, resulting in an increase in the size of the area 32 being heated and in a decrease both in the equilibrium temperature of the area 32 and in erosion.

It has been estimated that for a Harrier aircraft, a synchronous oscillation of all four nozzles by ±10° may enlarge the relative area heated, at a hovering altitude of 5 m, by a factor of 6, while the corresponding factor at touchdown is 2.5.

Of course, the oscillating motion of the nozzles 22 has effects on the aircraft 10 also, due to induced motion, which in turn might lead to pilot discomfort as well as pilot-induced oscillations (PIO), i.e. as the pilot is vibrated by the oscillatory motion, his hands may shake the controls of the aircraft. However, it has been found that at or within the typical angular limits quoted, ±10°, and at the typical frequency rate of 2 Hz, no significant problems of this nature arise.

Another conceivable problem is loss of vertical lift due to the thrust being vectored. However, it has been found that at the suggested typical oscillation domain of ±10° the loss is approximately 0.8% and this is not considered significant.

In the FIG. 2 embodiment it is envisaged that the four nozzles 22 are oscillated in synchronism. However, this need not be so.

Figure 3:
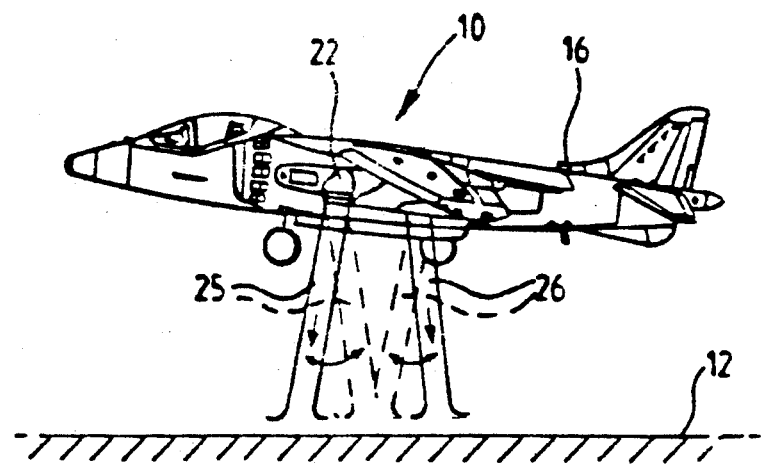
FIGS. 3 to 5 are analogous elevational views respectively illustrating further preferred embodiments.

Thus, referring now to FIG. 3, there is shown an arrangement in which, on a given engine on one side of the fuselage the front nozzles and the rear nozzles 22 are oscillated out of phase with one another, as is indicated by the jets 25, 26 shown in full and broken lines. The two front nozzles 22 are then be oscillated with each other in synchronism, as are the two rear nozzles 22. It may even be possible to arrange that the cool jet and the hot jet overlap or approach each other quite closely, whereby the affected ground/deck surface 12 will be kept cooler.

In any case, the FIG. 3 embodiment is effective to reduce induced aircraft motion and hence also PIO.

Figure 4:
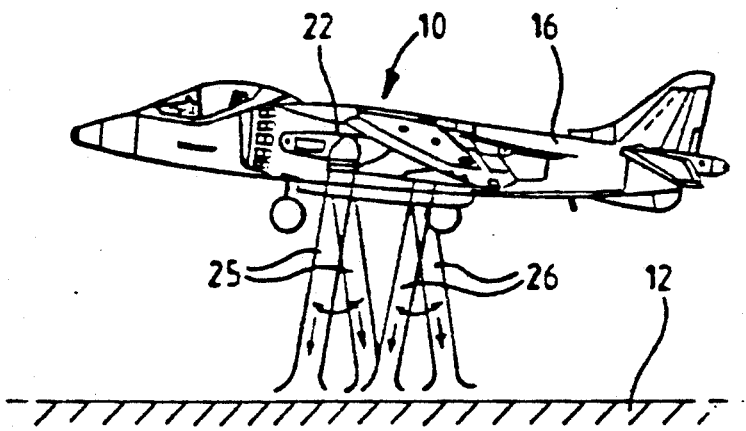

FIG. 4 illustrates an embodiment wherein there is an engine on each side of the fuselage wherein the nozzles are oscillated out of phase with one another in a different way: each pair of nozzles 22 belonging to the same engine is oscillated in synchronism but the pairs of the two engines are oscillated out of phase with one another, i.e. in 'left-and-right' asynchronism. Again, this embodiment is effective to reduce induced aircraft motion and hence also PIO. A similar arrangement could of course also be provided for the four vectorable nozzles of a single-engined aircraft, such as the Harrier.

Figure 5:
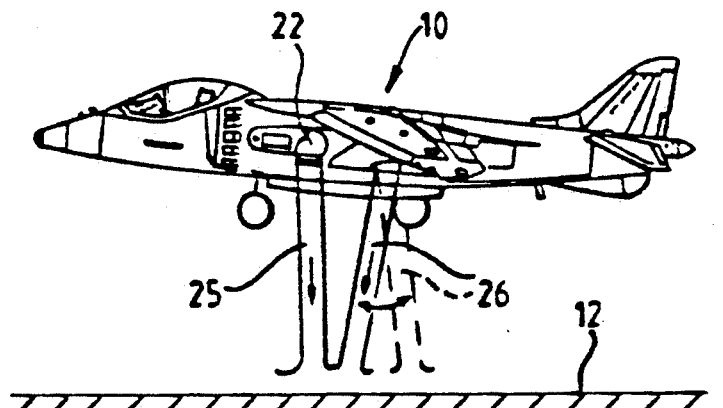

Finally, FIG. 5 illustrates an embodiment wherein the cool jets 25 are not oscillated at all and only the hot jets 26 are oscillated.

Of course, the invention is as applicable to single-engine aircraft as to aircraft having a power plant comprising several engines.

It should be understood that the invention is 'retrofittable', i.e. existing VSTOL aircraft may readily be modified to embody the present invention.

The actual means for effecting nozzle oscillation may be varied within wide limits, aircraft safety, reliability and weight penalty being among the important considerations. Thus the actuation may take place by pneumatic, hydraulic, electrical, etc. power means. However, it is preferred to make use of the power means that effect the vectoring movement of the nozzles, e.g. air motors. Means would then be provided to generate a control (modulating) signal to be applied to the control input of the air motors to produce the oscillations and, if motion of the nozzles in two planes is desired, also the rotating movement already mentioned above.

I claim:

1. Nozzle control apparatus for VSTOL aircraft power plant having at least one vectorable thrust nozzle, said apparatus comprising powered means for effecting vectoring movement of the said at least one nozzle, and oscillating means for oscillating said nozzle(s) about at least one axis so as to enlarge the area of a solid surface receiving, and affected by, the exhaust gases therefrom during hovering and/or landing.

2. Apparatus according to claim 1, wherein the said oscillating means is effective to oscillate the or each nozzle about two axes.

3. Apparatus according to claim 1, wherein the oscillating means includes generating means for generating a modulating signal and applying it to the powered means.

4. Apparatus according to claim 3, wherein the oscillation means is effective to oscillate the nozzle(s) ±10° about a generally vertical axis.

5. Apparatus according to claim 3, wherein the oscillation means is effective to oscillate the nozzle(s) by combining rocking and rotating movements.

6. Apparatus according to claim 3, wherein there is a plurality of said nozzles and the oscillation means is effective to oscillate the nozzles in synchronisn with each other.

7. Apparatus according to claim 3, wherein there is a plurality of said nozzles and the oscillation means is effective to oscillate the nozzles out of phase with each other.

8. Apparatus according to claim 1, wherein there is provided at least one nozzle connected to receive exhaust from the compressor of the jet engine, and there is also provided at least one other of said nozzles connected to receive exhaust from the turbine, and wherein the oscillating means is effective to oscillate the last-mentioned nozzle(s) only.

9. A method of operating the vectorable nozzle(s) of a VSTOL aircraft during hovering and landing, comprising oscillating the substantially vertically extending nozzle(s) about a generally vertical axis so as to enlarge the area of a solid surface receiving, and affected by, the exhaust gases therefrom.

* * * * *